United States Patent
Kruse et al.

(10) Patent No.: US 10,095,849 B1
(45) Date of Patent: Oct. 9, 2018

(54) TAG-BASED PROGRAMMING INTERFACE AUTHENTICATION

(71) Applicant: Amazon Technologies, Inc., Seattle, WA (US)

(72) Inventors: William Frederick Hingle Kruse, Seattle, WA (US); Jeffrey Cicero Canton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/491,922

(22) Filed: Sep. 19, 2014

(51) Int. Cl.
*G06F 21/60* (2013.01)
*G06F 21/30* (2013.01)
*G06F 17/27* (2006.01)

(52) U.S. Cl.
CPC .............. *G06F 21/30* (2013.01); *G06F 17/27* (2013.01)

(58) Field of Classification Search
CPC .... G06F 21/44; G06F 21/6218; G06F 21/554; G06F 21/566; G06F 21/552
USPC .......................................................... 726/17
See application file for complete search history.

(56) References Cited

U.S. PATENT DOCUMENTS

| | | | | |
|---|---|---|---|---|
| 5,729,745 A * | 3/1998 | Reina | ...................... | G06F 9/543 719/315 |
| 7,113,994 B1 * | 9/2006 | Swift | ...................... | G06F 21/33 707/999.009 |
| 9,401,904 B1 * | 7/2016 | Hankins | .................. | H04L 63/08 726/1 |
| 2001/0025349 A1 * | 9/2001 | Sharood | ............. | G06Q 30/0235 713/340 |
| 2001/0048030 A1 * | 12/2001 | Sharood | ................. | G05B 19/00 236/49.3 |
| 2002/0000092 A1 * | 1/2002 | Sharood | .................. | F25D 29/00 62/127 |
| 2003/0101158 A1 * | 5/2003 | Pinto | ....................... | H04L 49/90 707/999.001 |
| 2005/0114576 A1 * | 5/2005 | Romero | ................ | G06F 11/221 710/100 |
| 2005/0160063 A1 * | 7/2005 | Pan | .................... | G06F 17/30575 707/999.001 |
| 2005/0228981 A1 * | 10/2005 | Gavrilov | ................. | H04L 63/08 713/100 |
| 2007/0220907 A1 * | 9/2007 | Ehlers | ................... | F25B 49/005 62/126 |
| 2007/0260622 A1 * | 11/2007 | Mishra | ................ | G06F 17/3056 707/999.101 |
| 2008/0184273 A1 * | 7/2008 | Sekar | ..................... | G06F 13/102 719/319 |
| 2009/0094601 A1 * | 4/2009 | Vstovskiy | ............. | G06F 21/123 717/177 |
| 2009/0289718 A1 * | 11/2009 | Mechnig | ................ | H03G 3/001 330/278 |

(Continued)

*Primary Examiner* — Haresh N Patel
(74) *Attorney, Agent, or Firm* — Davis Wright Tremaine LLP

(57) ABSTRACT

Programming interfaces and other means of invoking operations on a hosted service may perform operations having similar semantic meaning, including cases where the operations act upon different objects. Tags may be associated with programming interfaces having similar semantic meaning. A user may be authorized to invoke programming interfaces associated with the tag. A user may be authorized to invoke new programming interfaces when they are deployed without additional authorization.

20 Claims, 7 Drawing Sheets

(56) References Cited

U.S. PATENT DOCUMENTS

| | | | |
|---|---|---|---|
| 2012/0240124 A1* | 9/2012 | Lipton | G06F 9/5066 718/104 |
| 2012/0304262 A1* | 11/2012 | Cucco | H04L 63/08 726/6 |
| 2014/0229722 A1* | 8/2014 | Harris | B82Y 10/00 713/1 |
| 2014/0282880 A1* | 9/2014 | Herter | H04L 63/205 726/4 |
| 2014/0366143 A1* | 12/2014 | Sandler | G06F 21/577 726/25 |
| 2015/0127690 A1* | 5/2015 | Hazlewood | G06F 17/30557 707/809 |
| 2015/0254560 A1* | 9/2015 | Laredo | G06N 5/04 706/46 |

* cited by examiner

TAG-BASED PROGRAMMING INTERFACE AUTHENTICATION

BACKGROUND

A cloud services provider may host various computing services on behalf of its customers. On a given computing device, the set of computing services hosted by the provider may change over time as customers add new services or change existing computing services. The provider may also host services using a multi-tenant configuration, so that the computing device may host services on behalf of a number of different customers. In these cases, the addition or removal of customers may also cause the mixture of services to change over time. In some cases, the rate of change may be rapid.

An aspect of hosting computing services may involve the application of an appropriate level of security. This may be achieved, for example, by applying access controls to various objects on the computing device. Typically, these access controls may be applied on a per-user basis or by permitting access to the objects to users associated with various roles, such as an administrator or super-user. The addition of a new service, for example, may involve configuring access controls for a potentially large number of objects and users. Accordingly, conventional approaches to managing security configurations may be challenging to apply in rapidly changing computing environments.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may include techniques and mechanisms for configuring security settings of programming interfaces based on the semantic meanings of operations performed by invoking the programming interfaces.

In various embodiments of the present disclosure, semantic-based security mechanisms may be employed in conjunction with changing service environments. A provider of hosted services may frequently alter the arrangement and configuration of deployed services. Because each deployed service may operate on a variety of resources, conventional security mechanisms might require a number of security configuration steps for each resource. Furthermore, each user that might access the system may further require configuration steps applicable to each resource.

The various aspects of the present disclosure may be employed in conjunction with various other components in addition to programming interfaces. In general, the various aspects of the present disclosure may be employed in conjunction with components that are associated with operations performed on a computing device, networking device, processor, and so on. Examples of such components include programming interfaces, executable processes, business objects, hardware interfaces, and so on. Each of these may be associated with various operations, the operations having a semantic meaning. Embodiments of the present disclosure may be employed to authorize or prevent performance of these operations. For clarity, the present disclosure refers to programming interfaces; however, the various aspects of the disclosure apply to any component of the type just described.

Figure 1A:
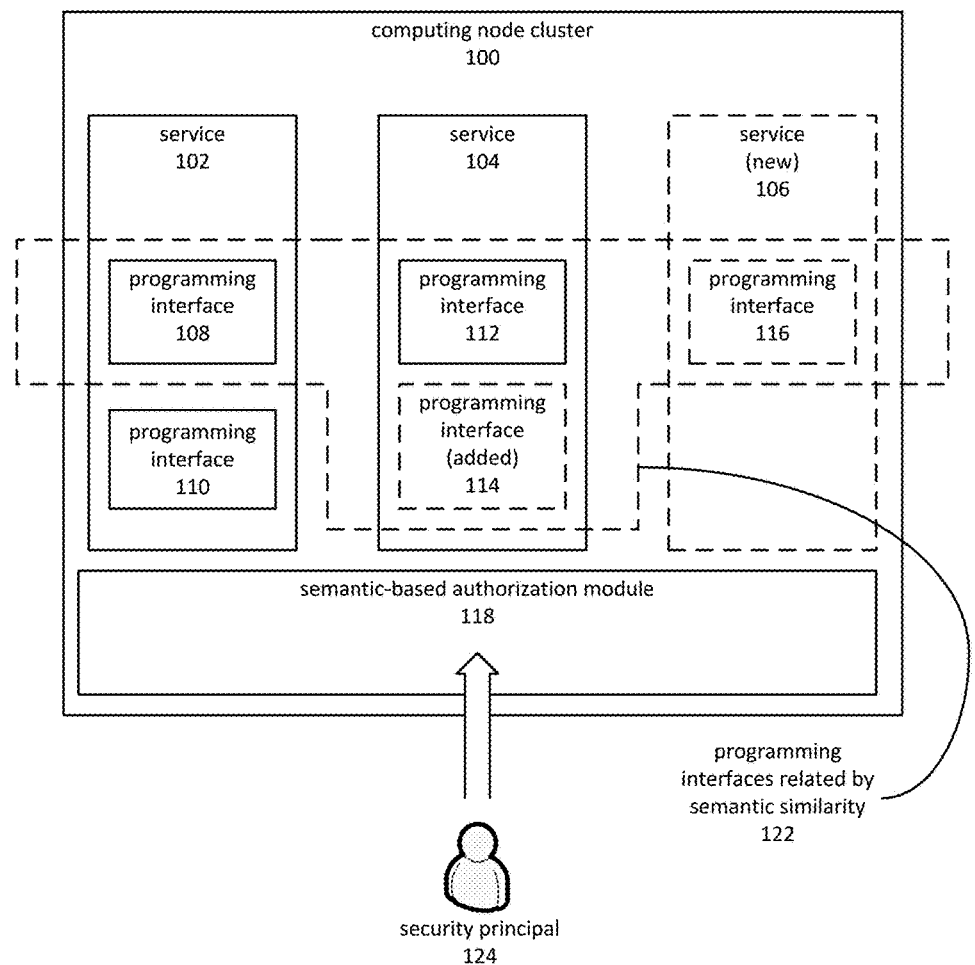
FIG. 1A is a block diagram depicting an embodiment of a system in which access to programming interfaces is mediated by a mechanism for applying semantic-based security.

FIG. 1A is a block diagram depicting an embodiment of a system in which access to programming interfaces is mediated by a mechanism for applying semantic-based security. A computing node cluster 100 may be configured to operate a collection of services 102-106. Computing node cluster 100 may be operated by a provider of hosted services, such as a cloud-based provider of hosted web services. It may comprise one or more computing nodes on which services 102-106 operate. It may be the case that services are added to and removed from the cluster periodically. For example, services 102 and 104 might initially be operating on computing node cluster 100, and service 106 may be subsequently added.

Each of services 102-106 may comprise a number of programming interfaces 108-116 for performing various operations. A programming interface may comprise a protocol for invoking the interface to perform an operation and for retrieving information that is produced or obtained by invoking the operation. A programming interface may also comprise executable instructions, hardware components such as processors, storage devices, web servers, load balancers, and so on. These elements may process information supplied according to the protocol, perform various operations associated with the programming interface, and in some cases provide a result of performing the various operations.

In some cases, a resource operated on by a programming interface, such as programming interface 108, may also be operated on by another programming interface, such as programming interface 116. In other cases, a resource operated by one programming interface may not be utilized by any other programming interface. However, the resources used by programming interfaces may be similar in various aspects even if they are not the same resource. For example, programming interface 108 might, when invoked, enumerate a first list. Programming interface 116 might, when invoked, enumerate a second list. These two lists may be separate entities. For example, each may be stored in a separate file. However, code executing on behalf of a security principal 124 may wish to access the first and second lists using the programming interfaces 108 and 116, respectively. Using conventional techniques, an access control list ("ACL") might be set for each list in order to grant access to the security principal.

Embodiments of the present disclosure may be employed to enable a security principal to invoke programming interfaces without separately modifying ACLs. A semantic-based authorization module 118 may be employed to provide code operating on behalf of security principal 124 with access to various programming interfaces based on the semantic meaning of the operations performed by the programming interfaces. A module may include executable code and/or circuitry configured to perform a computing function. A module may comprise various sub-modules distributed among or within various other code elements. The term module may also be used to describe a related group of components. In FIG. 1, semantic-based authorization module 118 may perform various functions related to authorizing invocation of programming interfaces 108-116. Semantic-based authorization module 118 may comprise various components distributed within services 102-106. Embodiments may, in some cases, perform authorization after a programming interface has been invoked. The authorization in such cases may occur during a function prologue step or may be deferred until a later stage of processing a programming interface invocation.

Programming interfaces may be grouped according to the semantic meanings of operations performed by invoking the respective programming interfaces. In FIG. 1, for example, programming interface 108 may perform an operation having a first semantic meaning, and programming interface 112 may perform an operation having a second semantic meaning. Semantic meaning may refer to the nature of the operation, including resources that are accessed by performing the operation, how the resources are affected by performing the operation, the type of data contained in the resource, side effects of accessing the resources, and so on. The semantic meaning of operations performed by each of programming interfaces 108 and 112 may be compared to determine if they are similar to an extent sufficient to be considered related for authorization purposes. In FIG. 1, this is depicted by the grouping of programming interfaces related by semantic similarity 122. Two programming interfaces may be considered to have similar semantic meaning when, for example, they perform the same or similar operations, but on different objects.

Semantic meaning may be viewed, in various embodiments, in terms of the second-order effects of operations performed by an API, upon the API's invocation. A second-order effect may be viewed as referring to the nature of the operations performed, rather than the specific objects acted upon. Second-order effects may also include factors such as cost or system-wide effects. For example, a hosted service may impose certain costs related to factors such as central processing unit ("CPU") utilization, network bandwidth, or other resources consumed by performing an operation. A second-order effect of an operation might be categorized as involving heavy resource utilization, light resource utilization, inconsistent or spikey resource utilization, and so on. A second-order effect might also be associated with a monetary value, such as "expensive to the customer," "expensive to the provider," "inexpensive," and so on. Programming interfaces may be compared on the basis of these second-order effects, and may be deemed semantically similar when the second-order effects are similar. For example, two programming interfaces might be deemed semantically similar based on each requiring no more than light resource utilization. Second-order effects may be considered with other factors, including the purpose for which the operation is invoked, the object affected by performing the operation, and so on.

Semantic-based authorization module 118 may utilize an identifier-based mechanism to identify the semantic meaning of operations performed by a programming interface and to identify programming interfaces related by semantic similarity. For example, programming interface 108 and programming interface 112 may each be associated with a tag or other form of identifier. When code operating on behalf of security principal 124 attempts to invoke programming interface 108 or programming interface 112, semantic-based authorization module 118 may determine if code executing on behalf of security principal 124 is authorized to invoke programming interfaces associated with the tag. In some embodiments, a security principal may be associated with a tag "A" and may invoke programming interfaces also associated with tag "A." In other embodiments, a security principal might also be able to invoke programming interfaces associated with tag "B" if tag "B" is determined to be semantically similar to tag "A," or is within a certain semantic distance from tag "A." The permitted distance may be determined based on various factors, such as a permissible level of risk.

A programming interface 114 may be added to an existing service 104. This may occur, for example, when a new version of a service is deployed or becomes operational. An added programming interface 114 may perform operations deemed semantically similar to those performed by programming interfaces 108 and 112, and accordingly may be treated as included in the group of programming interfaces related by semantic similarity 122. Some programming interfaces, such as programming interface 110, may be classified as semantically dissimilar and excluded from the group. Semantic similarity may be discovered based on a tag or other identifier associated with added programming interface 114. Semantic-based authorization module 118 may identify tags associated with programming interface 114. Assuming, for illustrative purposes, that programming interface 114 is also associated with tag "A," an invocation of programming interface 114 may be authorized by determining that code executing on behalf of security principal 124 is authorized to invoke programming interfaces associated with tag "A." In this manner, security principal 124 is enabled to utilize the new service without modifying ACLs associated with whatever resources accessed by performing the operations associated with programming interface 114. A similar approach may be employed upon the addition of new service 106, which may comprise programming interface 116.

Figure 1B:
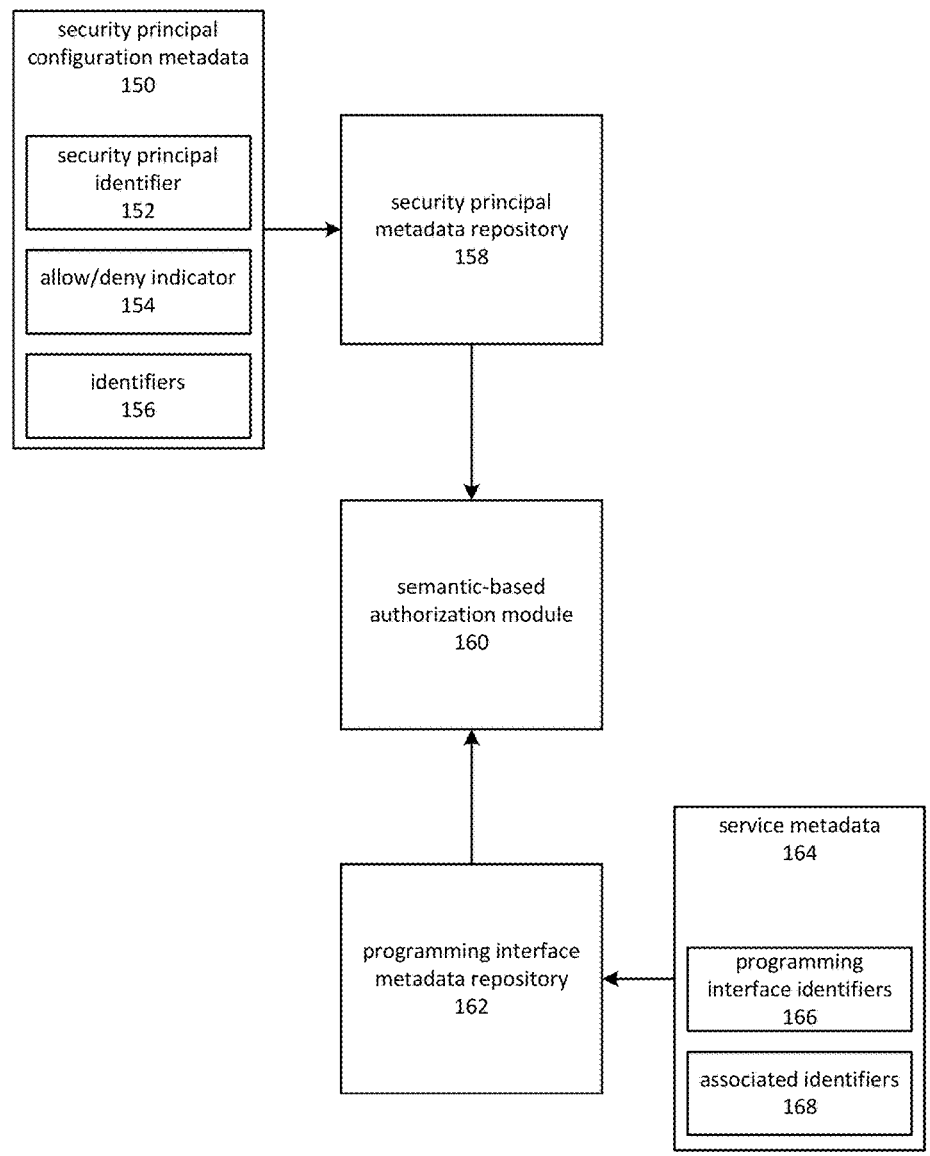
FIG. 1B is a block diagram depicting configuring security settings in a system that utilizes a semantic-based security mechanism.

FIG. 1B is a block diagram depicting configuring security settings in a system that utilizes a semantic-based security mechanism. A semantic-based authorization module 160 may access a security principal metadata repository 158 and programming interface metadata repository 162 to authorize an invocation of a programming interface by code executing on behalf of a security principal. Information pertaining to the security principal may be obtained from security principal metadata repository 158. The information may include one or more identifiers indicative of the semantic meanings of operations for which the security principal is authorized. Embodiments may access the programming interface metadata repository 162 to obtain one or more identifiers describing the semantic meanings of operations performed by the programming interface being invoked. Although repositories 158 and 162 are depicted as distinct elements, in various embodiments the information may be stored using a variety of storage mechanisms and configurations.

Security principal configuration metadata 150 information may be stored in security principal metadata repository 158. The information contained in security principal configuration metadata may be supplied whenever it becomes necessary to alter the access rights granted to the security principal. However, note that the security configuration of a new service may be established in some cases without modifying the access rights associated with the user.

Security principal configuration metadata 150 may comprise information, such as security principal identifier 152, allow/deny indicator 154, and identifiers 156. This information may be conveyed to a system for configuring security principal through a variety of mechanisms including programming interfaces, text files, extended markup language ("XML") files, and so on. A security principal identifier 152 could include the name of a user. Identifiers 156 may comprise a list of tags or other identifiers corresponding to the semantic meanings of operations that may be performed on behalf of the security principal. Allow/deny indicator 154 may be used, in some embodiments, to allow for the tags to correspond to the semantic meanings of operations that code that is executing on behalf of a security principal should not be allowed to invoke.

In some cases and embodiments, security settings for a service may be set independently of security settings for a security principal. In addition, in some cases and embodiments, security settings may be set without knowledge of security principals or of hierarchies or groups of security principals. For example, the security settings for a new service may be set without regard to whether or not an "administrator" or "power user" group is available, or whether some security role has been defined.

Security settings for a service may be conveyed via service metadata 164. Information contained in service metadata 164 may include programming interface identifiers 166 and associated identifiers 168. This information may be conveyed through a variety of means including programming interfaces, text files, XML files, and so on. Programming interface identifiers 166 may comprise identifiers of one or more programming interfaces contained in the service being configured. The programming interfaces may be identified, in various embodiments, using one or more of a textual description, a memory address or program offset, a globally unique identifier, and so on. Associated identifiers 168 may indicate identifiers associated with the programming interfaces. The identifiers may be indicative of or correspond to the semantic meaning of operations performed by the programming interface or interfaces with which they are associated.

The information conveyed in service metadata 164 may be stored in programming interface metadata repository 162. In various embodiments, the information may be in response to deploying a new service or modifying an existing service. A system for providing hosted services may receive the information and store it in programming interface metadata repository 162, or whatever storage mechanism or location is in use. Once the information has been stored, the new service may become operational without the need to alter security settings associated with the security principal, and without knowledge of hierarchies, groups, or roles that contain security principals as members.

In some embodiments, programming interface metadata repository 162 may comprise facilities provided by an operating system to maintain resource descriptors (which may also be referred to as object descriptors, security descriptors, descriptors, or other similar terms) identifying various objects in the system that may be subject to access controls. A resource descriptor or other object may comprise a value that uniquely identifies a programming interface. In some embodiments, the value may uniquely identify the programming interface with respect to both other programming interfaces and other securable objects.

Figure 2:
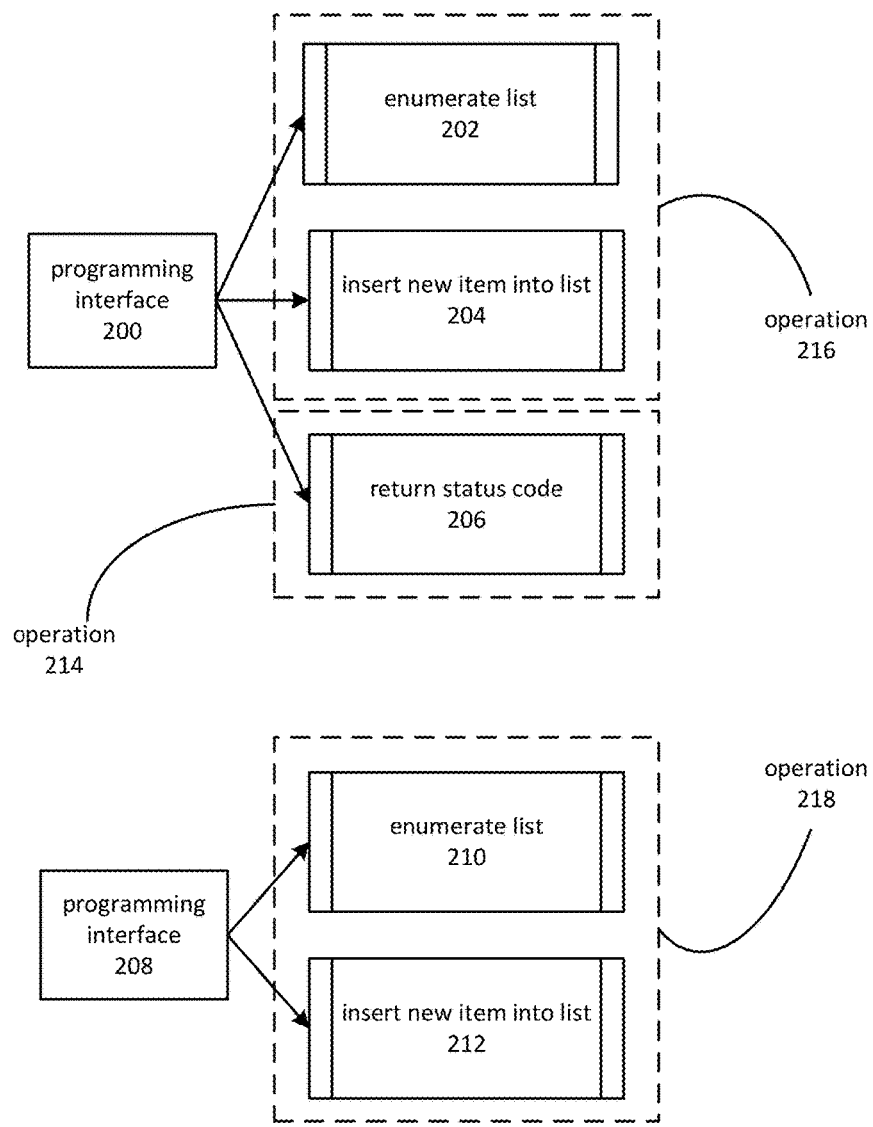
FIG. 2 is a block diagram depicting aspects of determining semantic similarity between two programming interfaces.

FIG. 2 is a block diagram depicting aspects of determining semantic similarity between two programming interfaces 200 and 208. FIG. 2 is intended to be illustrative of one possible technique for determining semantic similarity. Various other techniques may be employed, and accordingly FIG. 2 should not be construed so as to limit the scope of the present disclosure.

A process of determining semantic similarity may comprise determining the semantic meanings of operations performed by the programming interfaces and then comparing the semantic meanings. The semantic meanings of operations performed by a programming interface may be determined by identifying, grouping, and classifying operations and sub-operations performed by a programming interface upon its invocation. A programming interface, such as programming interface 200, may comprise various sub-operations. For example, programming interface 200 may comprise an enumerate list 202 sub-operation, an insert new item into list 204 sub-operation, and a return status code 206 sub-operation. These may be grouped into operations, such operations 216 and 214. Similarly, programming interface 208 may comprise sub-operations enumerate list 210 and insert new item into list 212. These sub-operations 210 and 212 may be grouped into operation 218.

Identification of semantic meaning associated with a programming interface may involve identification of the semantic meaning of lower-level operations followed by grouping and reclassification of semantically important elements and discarding of semantically unimportant elements. For example, for programming interface 200, a semantic meaning of "list enumeration" may be associated with the enumerate list 202 sub-operation. Similarly, a semantic meaning of "list insertion" may be associated with the insert new item into list 204 sub-operation. These sub-operations may be grouped into operation 216, which may then be associated with a semantic meaning of "list manipulation." The grouping operation may therefore condense more specific semantic meanings with more general ones. In various cases, multiple groupings may be possible. In such cases, comparison of semantic similarity may be based on a semantic meaning selected based on factors, such as statistical likelihood, best fit, and so forth. In other embodiments, multiple possible semantic meanings may themselves form a basis of comparison, since a large degree of overlap in possible semantic meanings for each of two programming interfaces may indicate that the two interfaces are semantically similar.

The semantic meanings of operations performed by programming interface 200 may be compared to the semantic meanings of operations performed by programming interface 208. Operation 216, having been associated with a semantic meaning of "list manipulation," may be compared to operation 218, which may have also been associated with a semantic meaning of "list manipulation." These two operations may therefore be deemed semantically similar. In various cases, the similarity may not be exact. For example, operation 216 may perform list manipulation on a different list object other than the list manipulation performed by operation 218. In various cases, however, these two operations may be treated as semantically similar even though they operate on different objects.

In FIG. 2, operation 214 has no analogue in programming interface 208 to which it may be compared. In some cases, this type of discrepancy may indicate that the programming interfaces being compared are semantically dissimilar. However, it might be the case that the operation does not substantially affect the semantic meaning of the programming interface with which it is associated. For example, in FIG. 2 operation 214 might be associated with a semantic meaning of "status and error reporting." Programming interface 208 might use an implicit exception handling mechanism rather than explicitly returning a status code. This type of difference may not substantially alter the effect of invoking programming interface 208, as compared to the effect of invoking programming interface 200. Accordingly, programming interfaces 200 and 208 might be deemed semantically similar based on the similarity of operations 216 and 218, even though operation 214 in programming interface 200 has no direct analogue in programming interface 208.

Figure 3:
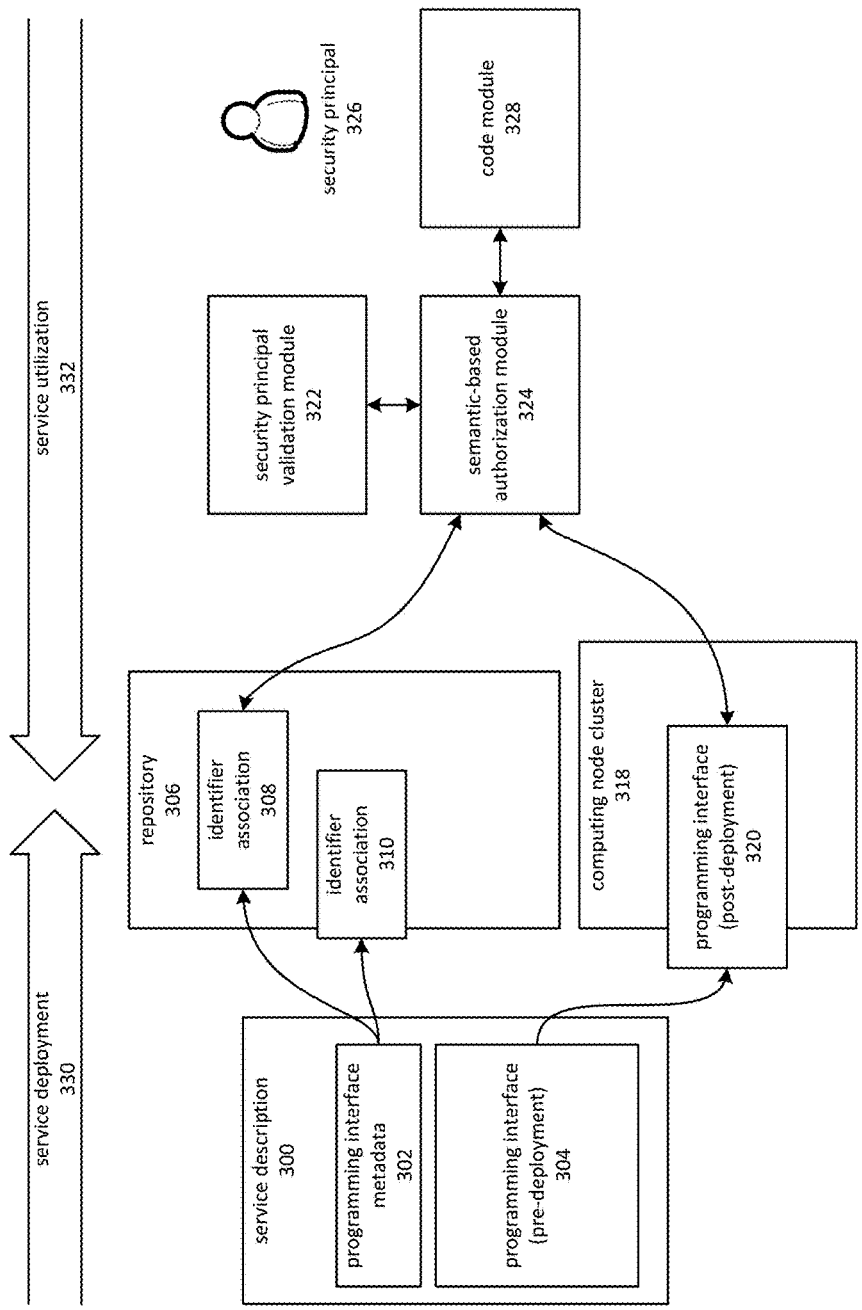
FIG. 3 is a block diagram depicting an embodiment of a system in which a new service may be deployed with security settings configured by modifying a repository of associations between identifiers and programming interfaces.

FIG. 3 is a block diagram depicting an embodiment of a system in which a new service may be deployed with security settings configured by modifying a repository of associations between tags and programming interfaces. A process for service deployment 330 may involve providing a service description 300 to a service hosting provider. The service description 300 could, for example, comprise programming interface 304 and programming interface metadata 302. Programming interface 304 could comprise a library of executable code for performing various operations. Programming interface metadata 302 may include information indicative of semantic meaning of operations performed when programming interface 304 are deployed and executed. This information may include information describing tags that may be associated with the programming interface to indicate semantic meanings associated with operations performed by the programming interface.

Deploying a new service may comprise operations such as storing, installing, and configuring programming interface 304 on computing node cluster 318. The deployed instructions are depicted in FIG. 3 as programming interface 320.

In various embodiments, security for the service may be configured by modifying repository 306. The repository 306 depicted in FIG. 3 is intended to be illustrative, and should not be viewed as limiting the scope of the present disclosure. In particular, information depicted in FIG. 3 as being stored in a repository may be stored elsewhere, in a single location, or in multiple locations.

Repository 306 may contain associations between identifiers and programming interfaces. An identifier association 308 may describe relationships between previously deployed services and an identifier, where the identifier may be indicative of a semantic meaning of the programming interfaces with which it is associated. Programming interfaces may be associated with a common identifier based on performing operations that are semantically similar. Service deployment 330 may involve identifying identifiers in the repository that are representative of the semantic meaning of a programming interface that is being deployed with the service. Any existing identifiers may be modified to indicate that the newly deployed programming interface performs operations with the same or similar semantic meaning as is indicated by the identifier. In a similar fashion, a new identifier association 310 may be added to the repository to indicate an association between an identifier and the newly deployed programming interface.

A process for service utilization 332 may involve invoking the deployed programming interface 320. The invocation may be made on behalf of security principal 326. A security principal 326 may correspond to a user, machine account, or other entity that may be validated by some set of credentials. Code module 328 may execute on behalf of security principal 326, and may attempt to invoke deployed programming interface 320.

Invocation of programming interface 320 may be controlled by semantic-based authorization module 324. Embodiments may validate the identity of security principal 326 using security principal validation module 322. A security principal validation module 322 may comprise software instructions and/or circuitry or other hardware components configured to ensure the identity of security principal 326. Security principal validation module 322 may also be used to obtain information describing operations that are authorized to be performed on behalf of security principal 326. The operations may be described in terms of semantic meaning through the use of tags or other identifiers. Semantic-based authorization module 324 may receive information confirming the identity of security principal 326 and identifying a set of identifiers, the identifiers corresponding to the semantic meaning of operations that code executing on behalf of security principal 326 is authorized to invoke. Semantic-based authorization module 324 may, upon an attempt to invoke programming interface 320, retrieve identifiers associated with programming interface 320 from repository 306. In the example of FIG. 3, these may be identifier associations 308 and 310. Semantic-based authorization module 324 may compare the identifiers associated with security principal 326 to those associated with programming interface 320, and thereby determine whether or not the invocation of programming interface 320 is authorized. In some embodiments, an identifier associated with security principal 326 must also be associated with programming interface 320. In other embodiments, approximate or fuzzy equivalences may be used. This may be based on semantic distance between identifiers associated with security principal 326 and identifiers associated with programming interface 320.

Figure 4:
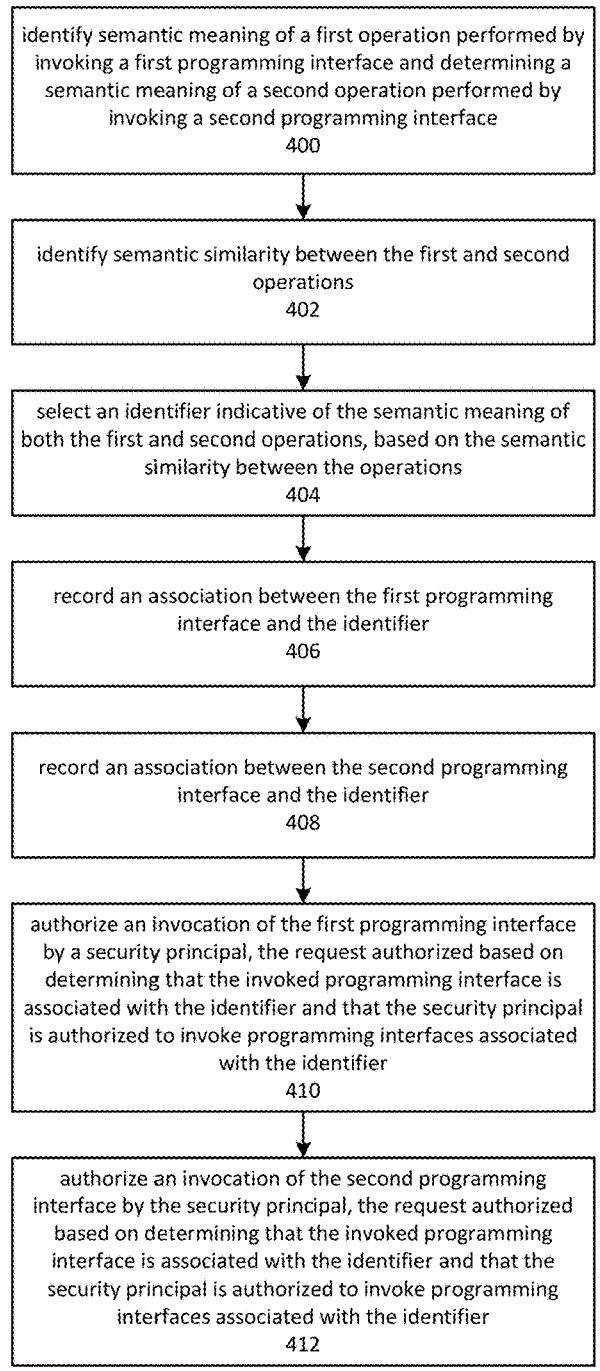
FIG. 4 is a flowchart depicting an embodiment of a process for authorizing invocation of a programming interface based on the semantic meaning of an operation performed by the interface upon its invocation.

FIG. 4 is a flowchart depicting an embodiment of a process for authorizing invocation of a programming interface based on the semantic meaning of an operation performed by the interface upon its invocation. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts identifying semantic meaning of a first operation performed by invoking a first programming interface and determining the semantic meaning of a second operation performed by invoking a second programming interface.

Element 402 depicts identifying semantic similarity between the first and second operations. Semantic similarity may be determined by comparing semantic distance between the first and second semantic meanings. A semantic distance estimate may be indicative of similarity in the nature of the operations being performed, the resources affected by performing the operations, and so on. In some embodiments, an ontology may be constructed to represent these aspects of semantic meanings. Graphs of the ontology may be employed to identify distance.

Embodiments may also identify semantic similarity based on information received from a development or deployment process. In an embodiment, lower-level semantic meanings of operations performed by an application programming interface ("API") may be identified by a developer. A deployment process may generate visual summaries of the lower-level semantic meanings and provide user-interface mechanisms for assigning like tags or other identifiers to programming interfaces with similar semantic meanings.

Embodiments may also identify lower-level semantic meanings based on information received from a development or deployment process, and then determine semantic similarity through an automated process. An initial stage may comprise a developer identifying lower-level semantic meanings during development. A developer might, for example, embed semantic meaning information into source code that may be compiled to form a programming interface. This may, for example, be accomplished through the use of attributes or annotations. Semantic similarity may then be determined by employing an ontological graph or other similar computerized processing technique.

Element 404 depicts selecting an identifier that is indicative of the semantic meaning of both the first and second operations, based on the semantic similarity between the two operations. The identifier may be selected to be indicative of a semantic meaning encompassing both the first semantic meaning and the second semantic meaning. For example, the first semantic meaning might be "enumerate list A," while the second semantic meaning might be "enumerate list B." A semantic meaning of "enumerate a list" might be selected to encompass the two semantic meanings. The encompassing of semantic meaning might then be associated with an identifier. Embodiments may incorporate one or more representational forms for the identifiers, such as textual, alphanumeric, numeric, binary, and so forth.

Element 406 depicts recording an association between the first programming interface and the identifier, and element 408 depicts recording a second association between the second programming interface and the identifier.

In an embodiment, programming interfaces may be treated as securable objects. A securable object may be described as an entity that may be associated with a security identifier. Examples of securable objects include files, processes, threads, memory regions, and so on. Embodiments may store a security identifier corresponding to a programming interface. In some embodiments, access control lists may be stored in association with the security identifier and used (in addition to semantic-based security mechanisms and techniques described herein) for providing an additional level of security. Regarding semantic-based security mechanisms and techniques, identifiers may be stored in association with the security identifier.

At element 410, embodiments may authorize an invocation of the first programming interface by code executing on behalf of a security principal. The request may be authorized based on a determination that the invoked programming interface is associated with the identifier and that the security principal is authorized to invoke programming interfaces associated with the same identifier. More generally, the request may be authorized based on determining that the programming interface performs operations having a semantic meaning corresponding to the semantic meaning of an operation that the security principal is authorized to perform.

In an embodiment, a first identifier associated with a security principal may be used as the basis for authorizing an invocation of a programming interface associated with a second tag not equal to the first. Embodiments may deem the first and second identifier to have semantic similarity sufficient to authorize the request even though the identifiers in this case are not equivalent. Embodiments may deem two identifiers to be semantically similar by comparing the semantic distance between semantic meanings associated with the two identifiers to a threshold distance. The semantic distance may be determined by an ontological graph. The threshold distance may be based on various factors, including a permissible level of risk. When greater authorization risk is permitted, the threshold distance may be greater. When less authorization risk is permitted, the threshold distance may be smaller.

At element 412, embodiments may authorize an invocation of the second programming interface by code executing on behalf of a security principal. The request may be authorized based on a determination that the invoked programming interface is associated with the identifier and that the security principal is authorized to invoke programming interfaces associated with the identifier.

An additional service may be deployed for use by code executing on behalf of the security principal without requiring modification of security identifiers or other records associated with the security principal. For example, even if the new service accesses a file, using techniques described herein the access control list for the file would not need to be modified to authorize access by the security principal. More generally, no security attributes associated with the security principal need to be modified in order for the security principal.

A record indicative of an additional programming interface included in a new service may be stored when the service is deployed. The record may comprise information describing an association between the additional programming interface and an identifier. If this identifier is also associated with a previously deployed programming interface that a security principal is authorized to invoke, both the new and previously deployed programming interface may be authorized based on the security principal's pre-existing authorization to invoke programming interfaces that perform operations that are the same as or are or semantically close to a semantic meaning associated with the security principal.

In various embodiments, deployment of a new service may comprise receiving information indicative of programming interfaces associated with the additional service. Deployment may further comprise receiving information indicating the semantic meanings of operations performed by the programming interfaces. Information concerning the programming interfaces included in a service and the semantic meanings may be received by a component of a system for hosting services on behalf of a customer.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 5:
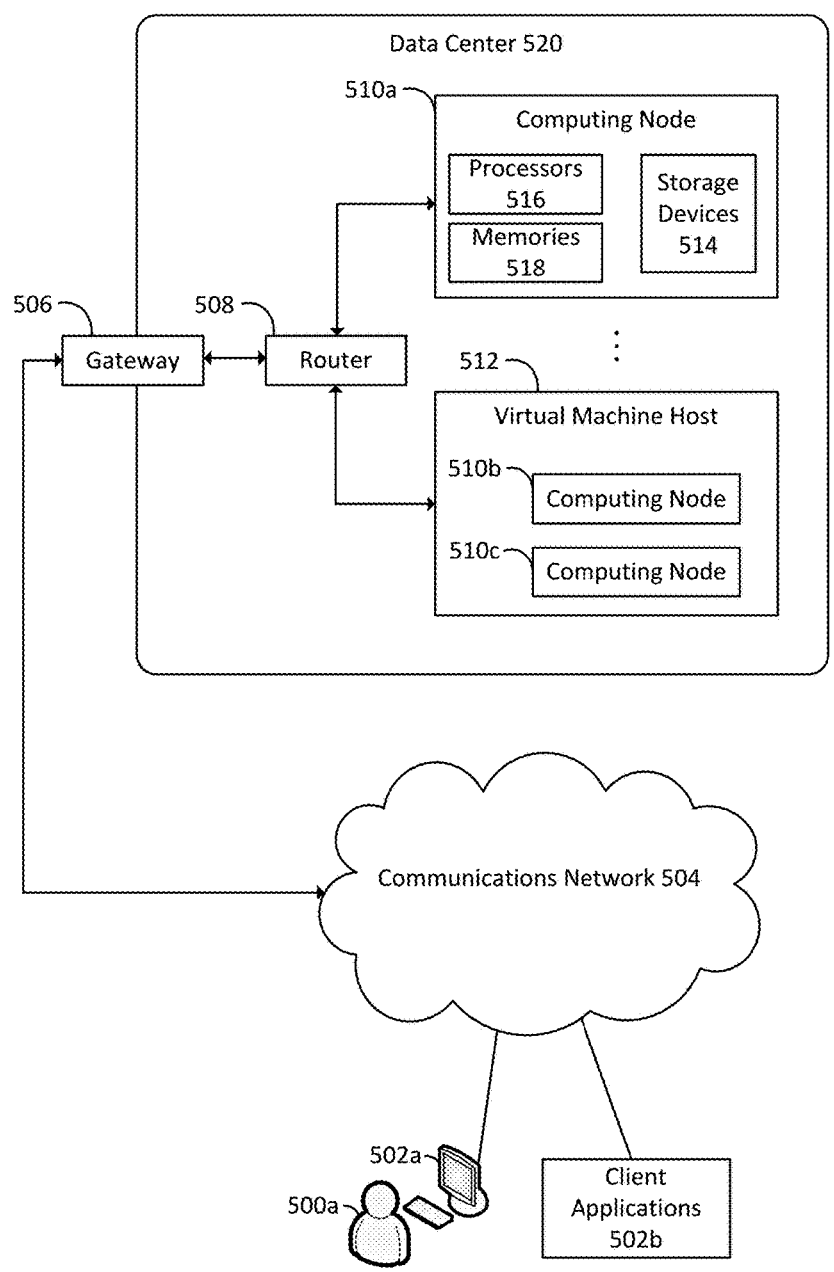
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
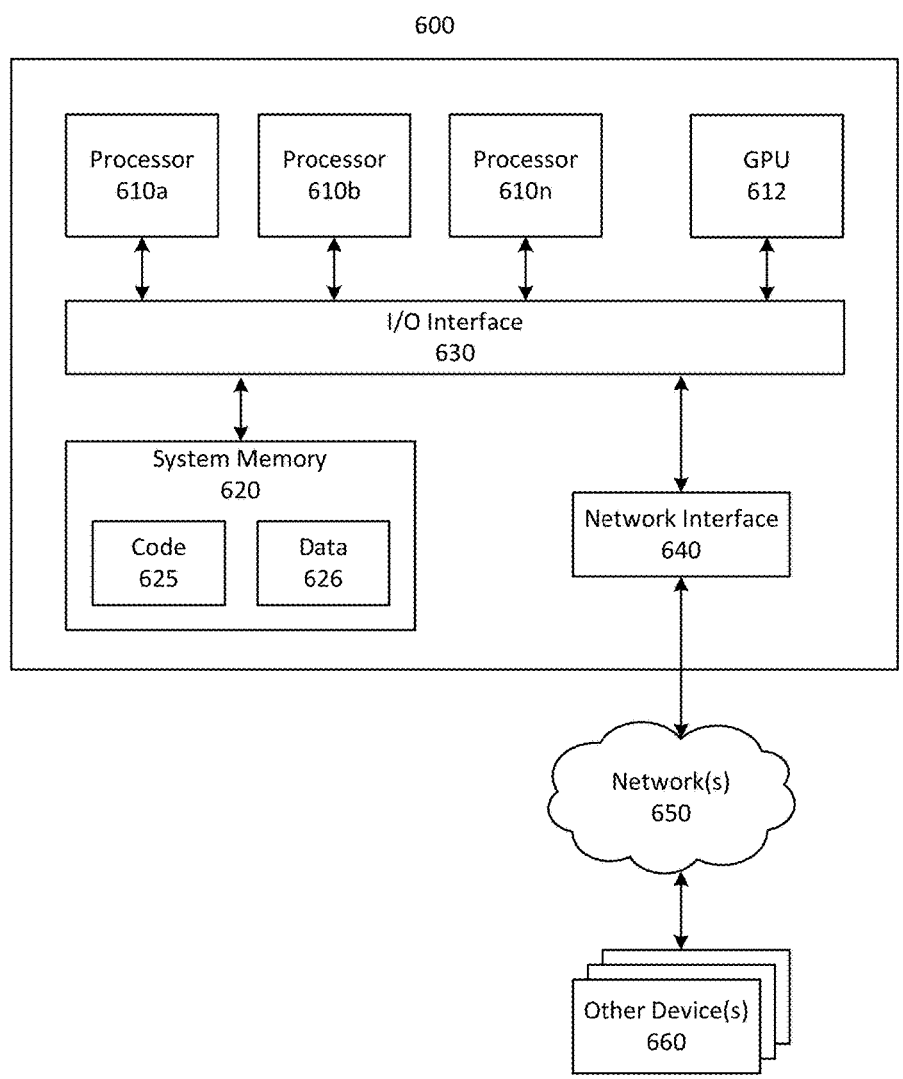
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC or MIPS ISAs, or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a first one or more computing nodes that, when activated, operates a first service comprising a first programming interface, the first programming interface configured to perform a second operation associated with a first securable object;
a second one or more computing nodes operating a second service comprising a second programming interface, the second programming interface configured to perform a second operation associated with a second securable object different than the first securable object;
one or more memories having stored thereon computer-readable instructions that, upon execution by a computing device, cause the system at least to:
store a first record indicative of an association between the first programming interface and an identifier;
store a second record indicative of an association between the second programming interface and the identifier, wherein the identifier is associated with the second programming interface based at least in part on the first operation having at least a threshold amount of similarity to the second operation;
authorize a first request to invoke the first programming interface on behalf of a security principal, based at least in part on comparing the identifier associated with the first programming interface to identifiers associated with the security principal that are indicative of operations for which the security principal is authorized; and
authorize a second request to invoke the second programming interface on behalf of the security principal, based at least in part on comparing the identifier associated with the second programming interface to the identifiers associated with the security principal.

2. The system of claim 1, further comprising one or more memories having stored thereon computer-readable instructions that, upon execution by the one or more computing devices, cause the system at least to:
store an additional record indicative of an additional programming interface associated with an additional service, the record being indicative of an association between the additional programming interface and the identifier, wherein the record is stored in response to the additional service becoming operational; and
authorize an additional request, by the security principal, to invoke the additional programming interface based at least in part on the association between the additional programming interface and the identifier, wherein no modification of security attributes associated with the security principal was required to authorize the additional request.

3. The system of claim 2, further comprising one or more memories having stored thereon computer-readable instructions that, upon execution by the one or more computing devices, cause the system at least to:
receive information indicative of a semantic meaning of an operation performed by the additional programming interface.

4. The system of claim 1, wherein the first record comprises for a value that uniquely identifies the programming interface.

5. The system of claim 1, wherein the first operation has a semantic meaning that corresponds to a second-order effect of performing the operation, wherein the second-order effect comprises at least one of cost or system-wide impact.

6. A computer-implemented method comprising:
storing a security setting associating a second programming interface with an identifier associated with a first programming interface, based at least in part on a first operation performed by the first programming interface upon invocation having at least a threshold amount of similarity to a second operation performed by the second programming interface upon invocation, the first operation associated with a first securable object different than a second securable object associated with the second operation;
authorizing an invocation of the second programming interface on behalf of a security principal, the authorizing based at least in part on determining that the security principal is authorized to invoke programming interfaces associated with the identifier; and
performing the second operation based at least in part on the authorizing of the invocation on behalf of the security principal.

7. The method of claim 6, further comprising:
forming an additional record indicative of an additional association between an additional programming interface and the identifier; and
authorizing an additional request, by the security principal, to invoke the additional programming interface based at least in part on accessing the additional record and determining that the additional programming interface is associated with the identifier, wherein no modification of security attributes associated with the security principal was required to authorize the additional request.

8. The method of claim 6, further comprising:
receiving data indicative of a service to be made operational, the service comprising an additional programming interface that, when invoked, performs an operation that is semantically similar to the first operation and semantically similar to the second operation, the data comprising information indicative of an association between the additional programming interface and the identifier.

9. The method of claim 6, wherein semantic meaning of the first operation corresponds to a second-order effect of performing the first operation.

10. The method of claim 6, further comprising:
processing information comprising information indicative of the security principal and information indicative of semantic meanings for operations the security principal is authorized to perform.

11. The method of claim 6, further comprising:
determining similarity between operations performed by invoking the first and second programming interfaces based at least in part on comparing similarities between a first resource affected by performing the first operation and a second resource affected by performing the second operation.

12. The method of claim 6, wherein similarity is determined by comparing semantic distance between a first semantic meaning of the first operation and a second semantic meaning of the second operation to a threshold distance that is based on a permissible level of risk.

13. A non-transitory computer-readable storage medium having stored thereon instructions that, upon execution by a computing device, cause the computing device at least to:
store a security setting that associates a second programming interface with an identifier associated with a first programming interface, based at least in part on a first operation performed by the first programming interface upon invocation having at least a threshold amount of similarity to a second operation performed by the second programming interface upon invocation, the first operation associated with a first securable object different than a second securable object associated with the second programming interface;

authorize an invocation of the second programming interface on behalf of a security principal, the authorizing based at least in part on determining that the security principal is authorized to invoke programming interfaces associated with the identifier; and perform the second operation based at least in part on the authorization of the invocation on behalf of the security principal.

14. The non-transitory computer-readable storage medium of claim 13, comprising further instructions that, upon execution by the one or more computing devices, cause the one or more computing devices to at least:

form an additional record indicative of an additional association between an additional programming interface and the identifier; and authorize an additional request, by the security principal, to invoke the additional programming interface based at least in part on accessing the additional record and determining that the additional programming interface is associated with the identifier, wherein no modification of security attributes associated with the security principal was required to authorize the additional request.

15. The non-transitory computer-readable storage medium of claim 13, comprising further instructions that, upon execution by the one or more computing devices, cause the one or more computing devices to at least:

receive data indicative of a service to be made operational, the service comprising an additional programming interface that, when invoked, performs an operation that is semantically similar to operations performed upon invocation of the first and second programming interfaces, the data comprising information indicative of an association between the additional programming interface and the identifier.

16. The non-transitory computer-readable storage medium of claim 13, wherein the first and second operations, when performed, have similar second-order effects.

17. The non-transitory computer-readable storage medium of claim 13, wherein semantic meaning of the first operation corresponds to a second-order effect of performing the first operation.

18. The non-transitory computer-readable storage medium of claim 13, comprising further instructions that, upon execution by the one or more computing devices, cause the one or more computing devices to at least:

process information comprising information indicative of the security principal and information indicative of semantic meanings for operations the security principal is authorized to perform.

19. The non-transitory computer-readable storage medium of claim 13, comprising further instructions that, upon execution by the one or more computing devices, cause the one or more computing devices to at least:

determine similarity based at least in part on comparing similarities between a first resource affected by performing the first operation and a second resource affected by performing the second operation.

20. The non-transitory computer-readable storage medium of claim 13, wherein similarity is determined by comparing semantic distance between a first semantic meaning of the first operation and a second semantic meaning of the second operation to a threshold distance that is based on a permissible level of risk.

* * * * *